Dec. 2, 1958   J. W. ANDERSON   2,862,346
GRASS CATCHER FOR LAWN MOWERS
Filed Aug. 9, 1957
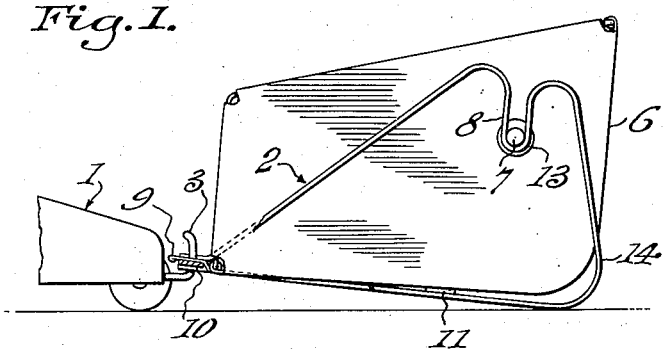
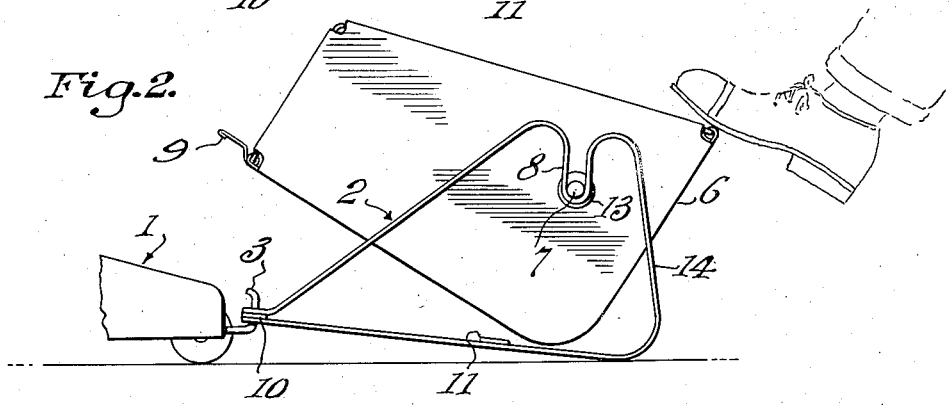
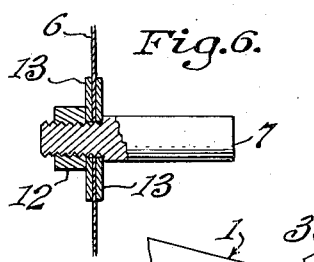
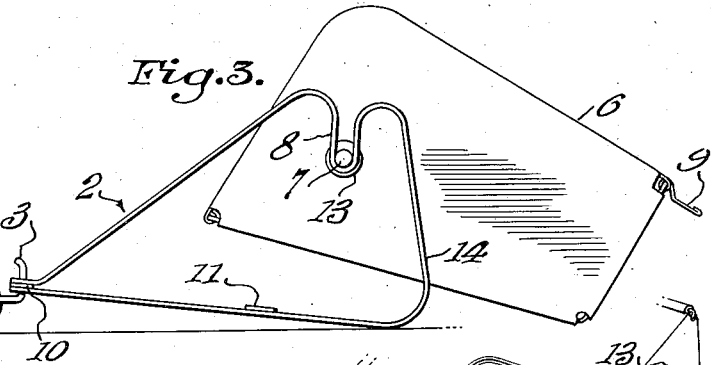
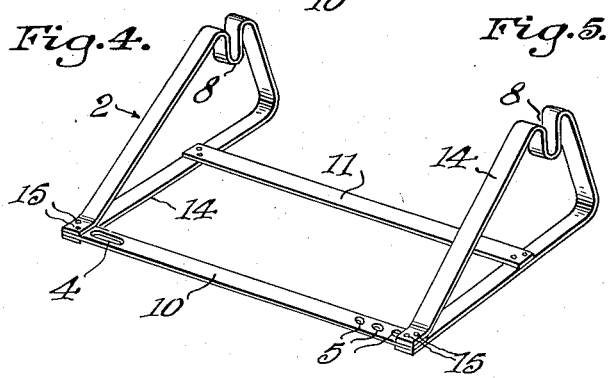
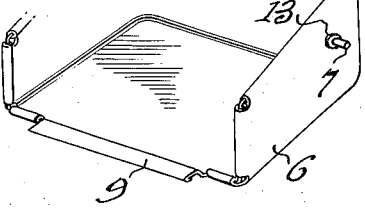
INVENTOR.
John W. Anderson
BY
ATTORNEYS

United States Patent Office 2,862,346
Patented Dec. 2, 1958

2,862,346

GRASS CATCHER FOR LAWN MOWERS

John W. Anderson, Portland, Oreg.

Application August 9, 1957, Serial No. 677,410

1 Claim. (Cl. 56—194)

(Granted under Title 35, U. S. Code (1952), sec. 266)

The invention described herein may be manufactured and used by or for the Government for governmental purposes without the payment of any royalty thereon.

This invention relates to an improved grass catcher for lawn mowers of virtually any make and size of hand type mowers and power mowers of the reel type.

An object of this invention is to provide a grass catcher for lawn mowers which can be easily attached to or removed from the mower.

Another object is to provide means whereby the grass accumulating in the grass catcher can be easily fed to the rear of the grass catcher.

Another object is to provide means whereby the grass may be dumped out of the grass catcher without removal of the catcher and without stooping or bending on the part of the operator.

As will be seen from the accompanying drawings and description, removal of the receptacle or catcher for dumping grass clippings at desired locations is a simpler and faster operation than that of disengaging the three hooks of a conventional catcher.

Furthermore, in conventional catchers, as the grass accumulates at the front of the receptacle, it is necessary to stop mowing frequently in order to stoop down or bend over to push the grass clippings to the rear of the catcher by hand. This disadvantage is obviated by the fact that the receptacle is designed to pivot around the horizontal lateral axis which passes through the trunnion bolts as will be illustrated and described. This feature permits grass clippings which accumulate at the front of the receptacle and which interfere with the flow of additional clippings to the unfilled portions to be moved to the rear of the receptacle.

The device by which the objects of this invention are attained is further illustrated by the accompanying drawings wherein:

Fig. 1 is a side elevation of the grass catcher in normal position;

Fig. 2 is a view similar to Fig. 1 with the receptacle tipped to move the grass back during cutting operations;

Fig. 3 is a view similar to Fig. 1 with the receptacle in grass dump position;

Fig. 4 is a perspective view of the frame;

Fig. 5 is a reduced fragmentary perspective view of the receptacle; and

Fig. 6 is an enlarged detailed view partly in section of one of the pivot trunnions.

Looking at the drawings with more particularity, it is seen that 1 is the lawn mower to which the grass catcher frame 2 is connected by means of hooks 3 located on mower 1 and slot 4 and holes 5 located on front bar 10. The mower can be virtually any make and size of the reel type, either hand or power operated. The slot 4 in combination with the holes 5 enable the operator to use different size mowers and still be able to center the mower in relation to the receptacle. The receptacle 6 is pivotally suspended within frame 2 by means of trunnions 7 resting on U-shaped supports 8. The receptacle 6 has a front lip 9 to prevent grass from falling between the mower and the receptacle. Frame 2 has a reinforcing cross piece 11. The trunnions 7 consist of a steel shoulder bolt, preferably having a $5/16$ inch S. A. E. thread and a $5/16$ inch S. A. E. nut 12. The $5/16$ inch cut washers 13 are placed on either side of the receptacle wall to maintain rigidity in the assembly. The frame 2 consists of the side frames 14 which are each of one piece, for simplicity in construction, preferably $3/4$ inch by $3/16$ inch mild steel. The ends of the side frames are riveted together and to the front bar 10 preferably by $3/16$ inch iron rivets 15.

The operation of the grass catcher is exceedingly simple. The frame 2 when attached is dragged along the ground in sled fashion. As the grass piles up in the receptacle, it can be tilted back by foot to move the grass back to the rear as shown in Fig. 2. When the operator desires to empty the receptacle at any point, he can dump it by tilting it back to the extreme position as shown in Fig. 3. The trunnion and U-shaped supports make for easy disengagement of the receptacle from the frame whenever the operator wishes to remove the said receptacle entirely.

Having thus described my invention, what I claim as new and wish to secure by Letters Patent is:

A grass catcher for lawn mowers comprising a receptacle including side walls and having an open side, oppositely disposed trunnions projecting outwardly from each side wall of said receptacle, a lip extending from said receptacle at the open side, a frame, said frame including a front bar with adjustable means for attachment to a lawn mower, reinforced parallel side frames attached to said front bar, said side frames each including a U-shaped support at its apex receiving said trunnions.

References Cited in the file of this patent

UNITED STATES PATENTS

| | | |
|---|---|---|
| 448,977 | Maxwell | Mar. 24, 1891 |
| 1,927,152 | Bolens | Sept. 19, 1933 |